US010212021B2

(12) United States Patent
Zeng et al.

(10) Patent No.: US 10,212,021 B2
(45) Date of Patent: Feb. 19, 2019

(54) NETWORK PROTOCOL CONFIGURATION METHOD AND APPARATUS

(71) Applicant: Huawei Technologies Co., Ltd., Shenzhen, Guangdong (CN)

(72) Inventors: Kun Zeng, Chengdu (CN); You Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 15/363,218

(22) Filed: Nov. 29, 2016

(65) Prior Publication Data

US 2017/0078135 A1 Mar. 16, 2017

Related U.S. Application Data

(63) Continuation of application No. PCT/CN2014/078924, filed on May 30, 2014.

(51) Int. Cl.
*H04L 12/24* (2006.01)
*H04L 29/06* (2006.01)
(Continued)

(52) U.S. Cl.
CPC .......... *H04L 29/06* (2013.01); *H04L 41/0213* (2013.01); *H04L 69/18* (2013.01);
(Continued)

(58) Field of Classification Search
CPC .. H04L 29/12028; H04L 43/00; H04L 61/103
See application file for complete search history.

(56) References Cited

U.S. PATENT DOCUMENTS 2,252,105 A 7/1940 Waters
5,719,861 A * 2/1998 Okanoue ................. H04L 12/56
(Continued)

FOREIGN PATENT DOCUMENTS

CN 1668030 A 9/2005
CN 1777124 A 5/2006
(Continued)

OTHER PUBLICATIONS

Bansal et al.; "OpenRadio: A Programmable Wireless Dataplane"; HotSDN'12; Helsinki, Finland; Aug. 13, 2012; 6 pages.
(Continued)

*Primary Examiner* — Chandrahas B Patel

(57) ABSTRACT

A network protocol configuration method and apparatus are disclosed. The network protocol configuration apparatus includes: a determining module, configured to determine at least one target function module according to a target network protocol, where the target network protocol is a protocol used for data processing; a configuration module, configured to configure the at least one target function module, where the at least one configured target function module is configured to process data according to the target network protocol; and a processing module, configured to process the data by using the at least one configured target function module. According to the present invention, different types of network protocol processing can be performed on data by using different configurations of a target function module, which can reduce device costs.

6 Claims, 9 Drawing Sheets

(51) Int. Cl.
*H04W 28/06* (2009.01)
*H04W 80/04* (2009.01)

(52) U.S. Cl.
CPC ......... *H04W 28/06* (2013.01); *H04L 41/0803* (2013.01); *H04W 80/04* (2013.01)

(56) References Cited

U.S. PATENT DOCUMENTS

| | | |
|---|---|---|
| 7,787,461 B2 | 8/2010 | Ciavaglia et al. |
| 8,149,867 B2 | 4/2012 | Karaoguz |
| 2002/0141342 A1 | 10/2002 | Furman et al. |
| 2002/0191543 A1 | 12/2002 | Buskirk et al. |
| 2003/0123449 A1 | 7/2003 | Kuhl et al. |
| 2009/0170472 A1 | 7/2009 | Chapin et al. |
| 2010/0008271 A1 | 1/2010 | Duan |
| 2010/0113088 A1 | 5/2010 | Erceg et al. |
| 2013/0286851 A1 | 10/2013 | Moser et al. |

FOREIGN PATENT DOCUMENTS

| | | |
|---|---|---|
| CN | 101018236 A | 8/2007 |
| CN | 101022350 A | 8/2007 |
| CN | 101202975 A | 6/2008 |
| CN | 101257507 A | 9/2008 |
| CN | 102195977 A | 9/2011 |
| CN | 102448199 A | 5/2012 |
| CN | 102546477 A | 7/2012 |
| EP | 2252105 A2 | 11/2010 |
| EP | 2464170 A1 | 6/2012 |

OTHER PUBLICATIONS

Open Networking Foundation; OpenFlow Switch Specification Version 1.3.4 (Protocol version 0x04); Mar. 27, 2014; 171 pages.

\* cited by examiner

NETWORK PROTOCOL CONFIGURATION METHOD AND APPARATUS

CROSS-REFERENCE TO RELATED APPLICATIONS

This application is a continuation of International Application No. PCT/CN2014/078924, filed on May 30, 2014, the disclosure of which is hereby incorporated by reference in its entirety.

TECHNICAL FIELD

The present invention relates to the field of computer technologies, and in particular, to a network protocol configuration method and apparatus.

BACKGROUND

The development of communications network technologies causes serious imbalance between a technology evolution speed and a device life cycle. For example, a network protocol is updated about every 18 months, and the technology evolution speed is fast, but a service life of a network infrastructure device is at least several years and even decades, and the device life cycle is long. Due to the serious imbalance between the technology evolution speed and the device life cycle, the network infrastructure device needs to include a network protocol configuration apparatus that can configure a network protocol. The network protocol configuration apparatus can support different network protocols, and can implement, according to a specific network protocol, a service corresponding to the network protocol. In this way, networks of multiple standards can exist in one communications network, and a network of each standard uses a network protocol corresponding to the network of the standard. An existing configuration method for supporting multiple network protocols in a network protocol configuration apparatus is to integrate multiple single-mode network protocol configuration apparatuses into one multimode network protocol configuration apparatus, and each single-mode network protocol configuration apparatus supports one network protocol. For example, multiple baseband processing boards are inserted into a same baseband subrack of a multimode base station, and each baseband processing board supports one network protocol. In this method in which baseband processing boards are stacked so that a same multimode base station supports different network protocols, a division granularity of a protocol implementation unit is excessively coarse, and is merely a baseband processing board of a protocol, one baseband processing board supports one network protocol, and a device has low-level integration. Actually, baseband processing boards of different network protocols reuse a function module, for example, each baseband processing board includes a function module that performs decoding processing. In this case, the reused function module is manufactured repeatedly in the baseband processing boards, which apparently increases manufacturing costs.

SUMMARY

Embodiments of the present invention provide a network protocol configuration method and apparatus, to perform different types of network protocol processing on data by using different configurations of a target function module, which can reduce device costs.

A first aspect of the present invention provides a network protocol configuration apparatus, which may include:

a determining module, configured to determine at least one target function module according to a target network protocol, where the target network protocol is a protocol used for data processing;

a configuration module, configured to configure the at least one target function module, where the at least one configured target function module is configured to process data according to the target network protocol; and a processing module, configured to process the data by using the at least one configured target function module.

With reference to the first aspect, in a first feasible implementation manner, the configuration module includes:

an activation unit, configured to activate the at least one target function module according to the target network protocol;

a determining unit, configured to determine a parameter configuration of the target function module, where the parameter configuration is used to enable the target function module to process the data by using the target network protocol;

an allocation unit, configured to allocate a fragment physical resource to the target function module; and a tandem connection unit, configured to connect the target function module in tandem according to a tandem connection sequence corresponding to the target network protocol.

With reference to the first feasible implementation manner of the first aspect, in a second feasible implementation manner, the processing module is configured to successively input to-be-processed data into the at least one tandem-connected target function module, to process the data.

With reference to the first aspect, in a third feasible implementation manner, the selection module includes:

the determining module includes:

a receiving unit, configured to receive a control instruction, where the control instruction includes a target application program identifier, and a target application program identified by the target application program identifier is used to process the data by using the target network protocol;

a first selection unit, configured to select the target application program from an application program set according to the target application program identifier, and execute the target application program; and a second selection unit, configured to select, from a function module set by using the target application program, the at least one target function module configured to perform the target network protocol processing.

With reference to the third feasible implementation manner of the first aspect, in a fourth feasible implementation manner, if the control instruction includes configuration information used for establishing a data connection relationship with a target network protocol configuration apparatus, where the configuration information carries a device identifier of the target network protocol configuration apparatus, the apparatus further includes:

a connection establishment module, configured to establish, based on a specific protocol, a data connection to the target network protocol configuration apparatus identified by the device identifier, where the specific protocol includes at least one of a common public radio interface protocol or a common public physical interface protocol; and a transmission module, configured to transmit processed data to the target network protocol configuration apparatus.

A second aspect of the present invention provides a network protocol configuration apparatus, which may include a processor, where the processor is configured to determine at least one target function module according to a target network protocol, where the target network protocol is a protocol used for data processing;

the processor is further configured to configure the at least one target function module, where the at least one configured target function module is configured to process data according to the target network protocol; and the processor is further configured to process the data by using the at least one configured target function module.

With reference to the second aspect, in a first feasible implementation manner, the processor is further configured to activate the at least one target function module according to the target network protocol;

the processor is further configured to determine a parameter configuration of the target function module, where the parameter configuration is used to enable the target function module to process the data by using the target network protocol;

the processor is further configured to allocate a fragment physical resource to the target function module; and the processor is further configured to connect the target function module in tandem according to a tandem connection sequence corresponding to the target network protocol.

With reference to the first feasible implementation manner of the second aspect, in a second feasible implementation manner, the processor is further configured to successively input to-be-processed data into the at least one tandem-connected target function module, to process the data.

With reference to the second aspect, in a third feasible implementation manner, the apparatus further includes a receiver, where the receiver is configured to receive a control instruction, where the control instruction includes a target application program identifier, and a target application program identified by the target application program identifier is used to process the data by using the target network protocol;

the processor is further configured to select the target application program from an application program set according to the target application program identifier, and execute the target application program; and the processor is further configured to select, from a function module set by using the target application program, the at least one target function module configured to perform the target network protocol processing.

With reference to the third feasible implementation manner of the second aspect, in a fourth feasible implementation manner, if the control instruction includes configuration information used for establishing a data connection relationship with a target network protocol configuration apparatus, where the configuration information carries a device identifier of the target network protocol configuration apparatus, the processor is further configured to establish, based on a specific protocol, a data connection to the target network protocol configuration apparatus identified by the device identifier, where the specific protocol includes at least one of a common public radio interface protocol or a common public physical interface protocol; and the transmitter is configured to transmit processed data to the target network protocol configuration apparatus.

A third aspect of the present invention provides a network protocol configuration method, where the method includes:

determining at least one target function module according to a target network protocol, where the target network protocol is a protocol used for data processing;

configuring the at least one target function module, where the at least one configured target function module is configured to process data according to the target network protocol; and processing the data by using the at least one configured target function module.

With reference to the third aspect, in a first feasible implementation manner, the configuring the at least one target function module includes:

activating the at least one target function module according to the target network protocol;

determining a parameter configuration of the target function module, where the parameter configuration is used to enable the target function module to process the data by using the target network protocol;

allocating a fragment physical resource to the target function module; and connecting the target function module in tandem according to a tandem connection sequence corresponding to the target network protocol.

With reference to the first feasible implementation manner of the third aspect, in a second feasible implementation manner, the processing the data by using the at least one configured target function module includes:

successively inputting to-be-processed data into the at least one tandem-connected target function module, to process the data.

With reference to the third aspect, in a third feasible implementation manner, the determining the at least one target function module according to a target network protocol includes:

receiving a control instruction, where the control instruction includes a target application program identifier, and a target application program identified by the target application program identifier is used to process the data by using the target network protocol;

selecting the target application program from an application program set according to the target application program identifier, and executing the target application program; and selecting, by the target application program from a function module set, the at least one target function module configured to perform the target network protocol processing.

With reference to the third feasible implementation manner of the third aspect, in a fourth feasible implementation manner, if the control instruction includes configuration information used for establishing a data connection relationship with a target network protocol configuration apparatus, where the configuration information carries a device identifier of the target network protocol configuration apparatus, the method further includes:

establishing, based on a specific protocol, a data connection to the target network protocol configuration apparatus identified by the device identifier, where the specific protocol includes at least one of a common public radio interface protocol or a common public physical interface protocol; and after the processing the data by using the at least one configured target function module, the method further includes:

transmitting processed data to the target network protocol configuration apparatus.

In the embodiments of the present invention, when data needs to be processed by using a target network protocol, at least one target function module configured to perform target network protocol processing is determined according to the target network protocol, the at least one determined target function module is configured, and finally, the data is processed according to the target network protocol by using the at least one configured target function module. In this network protocol configuration method, function modules that implement a same function do not need to be manufactured repeatedly in a device that performs different types of target network protocol processing, and only a corresponding target function module needs to be determined according to each specific target network protocol, and corresponding configuration is performed on the target function module, so that one function module can be shared by multiple target network protocols, but configuration of a function module is different for each target network protocol. In this way, manufacturing costs of a function module in a network protocol configuration apparatus are reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a network protocol configuration apparatus is applicable to not only a base station on a network side, but also a terminal on a user side, and a network protocol configuration method is applicable to implementation of a network protocol on an access network side, and is a method for configuring a wireless network protocol on the access network side. Specifically, the wireless network protocol may be a 3GPP protocol or a non-3GPP protocol. The 3GPP protocol may include a 2G, 3G, or 4G protocol or the like, and the non-3GPP protocol may include a WIFI protocol or the like. A function module in the embodiments of the present invention may be a logic circuit/chip, a radio frequency circuit, computer code, or a process in a virtual machine. From the perspective of a protocol stack, a function module included in a function module set may have a processing function of at least one layer of a Packet Data Convergence Protocol (Packet Data Convergence Protocol, PDCP) layer, a Radio Link Control Protocol (Radio Link Control, RLC) layer, a Media Access Control (Media Access Control, MAC) layer, or a physical layer (Physical Layer, PRY).

The following describes the network protocol configuration apparatus provided in the embodiments of the present invention in detail with reference to FIG. 1 to FIG. 7.

Figure 1:
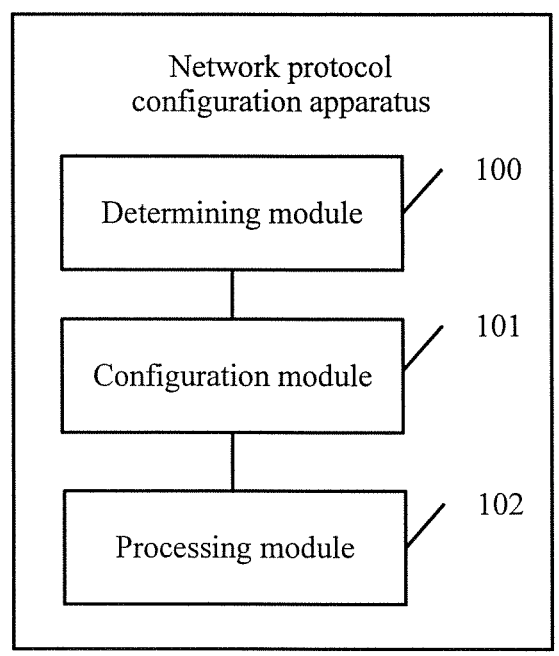
FIG. 1 is a schematic structural diagram of a network protocol configuration apparatus according to the present invention.

Referring to FIG. 1, FIG. 1 is a schematic structural diagram of a network protocol configuration apparatus according to an embodiment of the present invention. The network protocol configuration apparatus may include: a determining module 100, a configuration module 101, and a processing module 102.

The determining module 100 is configured to determine at least one target function module according to a target network protocol, where the target network protocol is a protocol used for data processing.

In an embodiment, when target network protocol processing needs to be performed on data by using a target network protocol, the determining module 100 determines at least one target function module according to the target network protocol. A trigger condition for target network protocol processing that needs to be performed on the data by using the target network protocol may be a user or service requirement. The user or service requirement may be determined by a user plane at a local end according to an air interface service policy delivered by a control-plane node, and target network protocol processing that needs to be performed on the data by using the target network protocol may also be determined by a user-plane node at the local end according to the air interface service policy delivered by the control-plane node. The air interface service policy is formulated by the control-plane node according to a wireless network service request of user equipment. The service request includes related attribute information of a service required by the user equipment, such as a service identifier, an identifier of a source network access device that sends service data, an identifier of a target network access device that receives the service data, a service type, and expected quality of service. The control-plane node determines the air interface service policy according to a related attribute of the service in the wireless network service request and with reference to an event prestored in the control-plane node, such as topology information of network access devices and/or state information of the network access devices and/or service subscription information of the network access devices. The air interface service policy may include an identifier of a network access device that executes the policy (it should be noted that if the local end and the control-plane node are integrated into one device, the identifier of the network access device does not need to be included) and an identifier of a protocol application program that executes the policy and that is in the network access device, or the air interface service policy may include a target function module that needs to be invoked/activated to perform target protocol processing in the corresponding target network protocol, invoking/activation steps of target function modules, parameter configurations during invoking/activation of the target function modules, and sizes of physical resources of a network access device that are occupied when function modules are invoked/activated. When receiving the air interface service policy delivered by the control-plane node, the local end can determine, from the air interface service policy, that target network protocol processing needs to be performed on the data by using the target network protocol. A method used by the determining module 100 to determine the at least one target function module may be: selecting, from a function module set, the at least one target function module configured to perform target network protocol processing. It should be noted that a target function module set includes all function modules that perform various types of network protocol processing. All types of protocol processing share one function module set, and function modules in the function module set may not be repeated, but each function module has a particular function.

Figure 4:
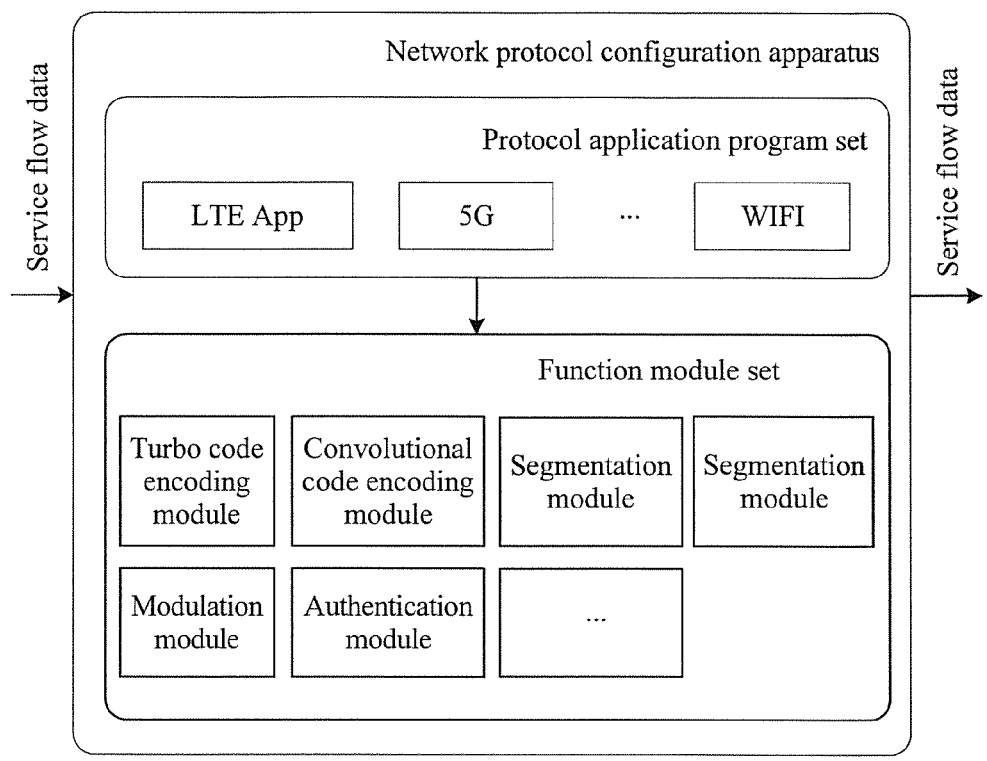
FIG. 4 is an actual block diagram of a network protocol configuration apparatus according to the present invention.

Implementation of a network protocol on an access network side is used as an example for description herein. A specific implementation device may be a base station device or a terminal device. The base station device or the terminal device may include a function module set. The base station device is used as an example for description herein. As shown in FIG. 4, a function module set of the base station device may include a Turbo code encoding module that performs encoding processing, a convolutional code encoding module, a hybrid automatic repeat request module, a segmentation module, an authentication module, a modulation module, an orthogonal frequency division multiple access (Orthogonal Frequency Division Multiple Access, OFDMA) module, a Code Division Multiple Access (Code Division Multiple Access, CDMA) module, a transmission module, and the like. Each function module in the function module set may support a single protocol, or may support multiple protocols. When a function module supports a single protocol, the function module is a dedicated function module of the protocol; when a function module supports multiple protocols, the function module is a public function module of the multiple protocols. A function module may be a logic circuit/chip, a radio frequency circuit, computer code, or a process in a virtual machine. When target network protocol processing needs to be performed on data by using a target network protocol in the base station device, the determining module 100 needs to select a target function module that performs target network protocol processing. The selected target function module may be one function module, or may be multiple function modules. The target network protocol herein may be a wireless network protocol. For example, when encapsulation processing is performed on data by using a 3.9G (Long Term Evolution, LTE) protocol in the base station device, the determining module 100 may select a header compression module, the authentication module, the segmentation module, a channel mapping module, the Turbo code encoding module, the modulation module, the OFDMA module, the transmission module, and the like in the function module set of the base station device. Because the determining module 100 selects a target function module according to a target network protocol, different target function modules may be selected for different target network protocols. For example, when encapsulation processing is performed on data by using a Mobile Telecommunications System (Universal Mobile Telecommunications System, UMTS) protocol in the base station device, the determining module 100 may select a header compression module, the authentication module, the segmentation module, a channel mapping module, the Turbo code encoding module, the modulation module, a spread spectrum module, the transmission module, and the like in the function module set of the base station device. Because an orthogonal frequency division multiple access technology is used in the LTE protocol, the OFDMA module needs to be selected. Because a spread spectrum communications technology is used in the UMTS protocol, the spread spectrum module needs to be selected.

The configuration module 101 is configured to configure the at least one target function module, where the at least one configured target function module is configured to process data according to the target network protocol.

In an embodiment, because one function module may support multiple network protocols, configurations of a same function module may be different in different network protocols. Therefore, when target network protocol processing needs to be performed on the data by using the target network protocol, the configuration module 101 needs to configure the at least one selected target function module according to a target configuration solution. The target configuration solution corresponds to the target network protocol, and therefore, the configured target function module processes the data according to the target network protocol.

Specifically, a configuration method used by the configuration module 101 to configure the target function module may be: invoking an application program corresponding to the target network protocol, and configuring, by the application program, the target function module by using a preset target configuration solution. A specific configuration solution may be: activating the target function module, then performing parameter configuration on the target function module, allocating a physical resource for running the target function module, when there is more than one target function module, connecting the target function module in tandem according to a tandem connection sequence corresponding to the target network protocol, and the like. After the configuration module 101 configures the target function module, the target function module may perform corresponding target network protocol processing on the data according to the target network protocol.

The processing module 102 is configured to process the data by using the at least one configured target function module.

In an embodiment, a specific method used by the processing module 102 to process the data by using the at least one configured target function module may be: inputting the data into the configured target function module, and performing, by the target function module, target network protocol processing on the data by using the target network protocol, and outputting processed data.

In this embodiment of the present invention, when data needs to be processed by using a target network protocol, at least one target function module configured to perform target network protocol processing is determined according to the target network protocol, the at least one determined target function module is configured, and finally, the data is processed according to the target network protocol by using the at least one configured target function module. In this network protocol configuration method, function modules that implement a same function do not need to be manufactured repeatedly in a device that performs different types of target network protocol processing, and only a corresponding target function module needs to be determined according to each specific target network protocol, and corresponding configuration is performed on the target function module, so that one function module can be shared by multiple target network protocols, but configuration of a function module is different for each target network protocol. In this way, manufacturing costs of a function module in a network protocol configuration apparatus are reduced.

Figure 2:
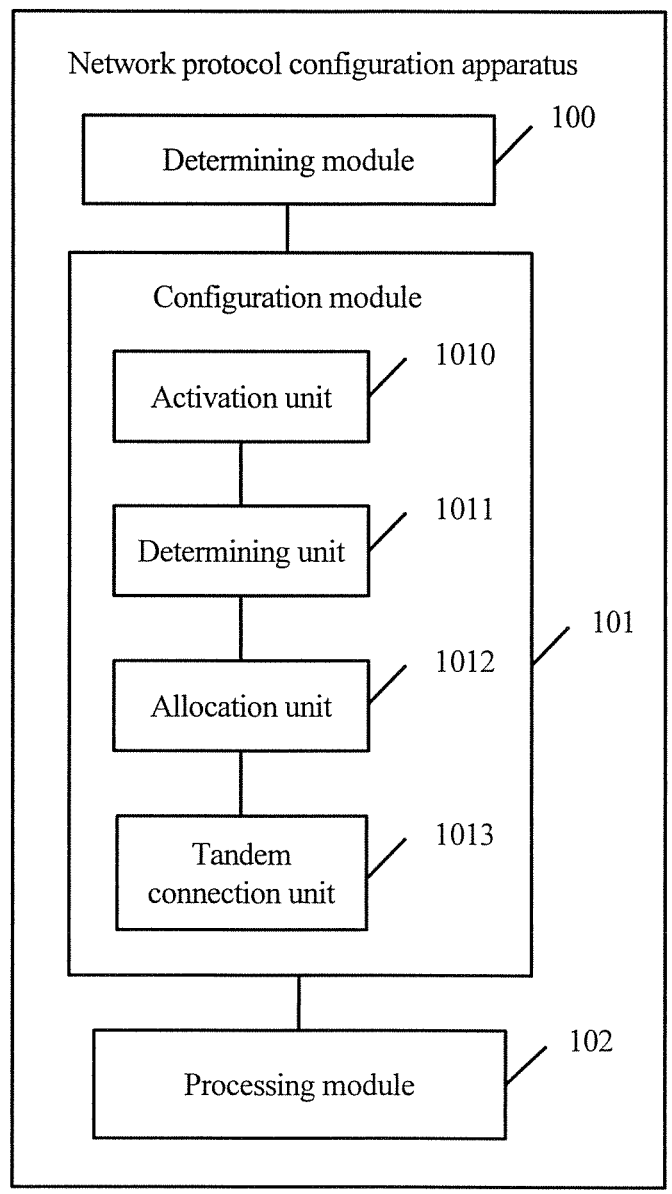
FIG. 2 is a schematic structural diagram of another network protocol configuration apparatus according to the present invention.

Referring to FIG. 2, FIG. 2 is a schematic structural diagram of another network protocol configuration apparatus according to an embodiment of the present invention. The network protocol configuration apparatus shown in FIG. 2 is obtained by optimizing the network protocol configuration apparatus shown in FIG. 1. The network protocol configuration apparatus shown in FIG. 2 includes all the modules of the network protocol configuration apparatus in FIG. 1. For the determining module 100, the configuration module 101, and the processing module 102, refer to descriptions of FIG. 1, and details are not described herein again. The configuration module 101 may include an activation unit 1010, a determining unit 1011, an allocation unit 1012, and a tandem connection unit 1013.

The activation unit 1010 is configured to activate the at least one target function module according to the target network protocol.

In an optional implementation manner, when at least one target function module needs to be invoked to process data, the activation unit 1010 first needs to activate the at least one target function module. The activation of a target function module is equivalent to enabling the target function module. When a function module is not used, the function module that is not used needs to be disabled, that is, the disabled function module does not receive or process any data. When a function module needs to be used, the activation unit 1010 enables the function module, that is, activates the function module. Because different target function modules are selected for different network protocols, the activation unit 1010 needs to activate a target function module according to an activation step that corresponds to the target network protocol and that is used to activate the target function module.

The determining unit 1011 is configured to determine a parameter configuration of the target function module, where the parameter configuration is used to enable the target function module to process the data by using the target network protocol.

In an optional implementation manner, because parameter configurations of a function module are different in different network protocols, when the data needs to be processed by using the target network protocol, the determining unit 1011 needs to determine the parameter configuration of the target function module, so that the configured target function module can process the data by using the target network protocol. Specifically, determining the parameter configuration of the target function module may be: determining a preset parameter configuration solution corresponding to the target network protocol, to perform parameter configuration on the target function module. The network protocol herein may be a wireless network protocol, that is, specific implementation of the network protocol on an access network side. A specific implementation device may be a base station or a terminal device. Because the parameter configuration solution corresponds to the target network protocol, after the target function module is configured, the target function module may process the data by using the target network protocol. Even for a same function module, parameter configuration solutions used for different target network protocols may be different. In this embodiment of the present invention, different target network protocols are implemented mainly by using different solutions for configuring a function module in a function module set, and backward compatibility of a protocol is also implemented in this manner. When a new protocol appears or a protocol is updated, only a quantity of function modules included in the function module set needs to be increased or only a parameter configuration solution in an original function module needs to be changed.

Specifically, a parameter configuration solution of a Turbo code encoding module included in a function module set of the base station device is used as an example for description herein. Whether the network protocol is an LTE protocol or a UMTS protocol, the Turbo code encoding module is selected as the target function module. When parameter configuration is performed on the Turbo code encoding module, if the target network protocol is the LTE protocol, the determining unit 1011 sets a bit rate parameter in the Turbo code encoding module to a ⅘ bit rate and sets a code length parameter to 20 bits; if the target network protocol is the UMTS protocol, the determining unit 1011 sets a bit rate parameter in the Turbo code encoding module to a ½ bit rate and sets a code length parameter to 15 bits. Other target function modules in the LTE protocol and the UMTS protocol are also configured according to corresponding parameter configuration solutions corresponding to the protocols. For example, the determining unit 1011 also configures a radio frequency module according to a transmit frequency band corresponding to the target network protocol. Therefore, the configured target function module can process the data by using the target network protocol corresponding to the configuration solution. The determining unit 1011 also performs corresponding configuration on another target function module in the network protocol.

The allocation unit 1012 is configured to allocate a fragment physical resource to the target function module.

In an optional implementation manner, the function module performs resource segmentation processing (such as virtualization and physical entity backup). Therefore, when target network protocol processing is performed on the data by using the target network protocol, the allocation unit 1012 needs to allocate a corresponding fragment physical resource to the target function module. The physical resource may be a size of memory occupied when the target function module runs and a location of the memory, or may be a circuit resource occupied when the target function module is invoked, for example, a quantity of single-chip microcomputers. A specific implementation method used by the allocation unit 1012 to allocate the fragment physical resource to the target function module by using a preset allocation policy corresponding to the target network protocol is described herein by using an example. For example, when a fragment physical resource is allocated to the Turbo code encoding module in the function module set of the base station device, because encoding is performed mainly by a single-chip microcomputer during encoding processing, when the target network protocol is the LTE protocol, the allocation unit 1012 may allocate two single-chip microcomputers to the Turbo code encoding module among target function modules of the LTE protocol, to perform encoding; when the target network protocol is the UMTS protocol, the allocation unit 1012 may allocate three single-chip microcomputers to the Turbo code encoding module among target function modules of the UMTS protocol, to perform encoding. The allocation unit 1012 also allocates physical resources to other target function modules in the LTE protocol and the UMTS protocol according to corresponding fragment physical resource allocation policies corresponding to respective protocols.

The tandem connection unit 1013 is configured to connect the target function module in tandem according to a tandem connection sequence corresponding to the target network protocol.

In an optional implementation manner, each network protocol has a tandem connection sequence of target function modules that corresponds to the network protocol. Because data processing procedures in network protocols may be the same, tandem connection sequences in some network protocols may be the same. Further, because determined target function modules may be different, tandem connection sequences may also be different. Therefore, each network protocol has a tandem connection sequence of target function modules that corresponds to the network protocol.

Specifically, that encapsulation processing is performed on the data by using the LTE protocol in the base station device is used as an example for description herein. The at least one selected target function module is a header compression module, an authentication module, a segmentation module, a channel mapping module, the Turbo code encoding module, a modulation module, an OFDMA module, a transmission module, and the like in the function module set of the base station device. The tandem connection unit 1013 connects the target function modules in tandem according to the following sequence: the header compression module, the authentication module, the segmentation module, the channel mapping module, the Turbo code encoding module, the modulation module, the OFDMA module, and the transmission module. It should be noted that the tandem connection sequence indicates a data processing sequence.

The processing module 102 is configured to successively input to-be-processed data into the at least one tandem-connected target function module, to process the data.

In an optional implementation manner, after the at least one target function module is activated, configured, and tandem-connected, the target function module may perform target protocol processing on the data. Therefore, the processing module 102 successively inputs the data into the at least one tandem-connected target function module to perform target protocol processing. It should be noted that a sequence in which the data is input into the tandem-connected target function modules should be the same as the sequence in which the target function modules are tandem-connected. Each target function module may implement corresponding target network protocol processing on the data.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Figure 3:
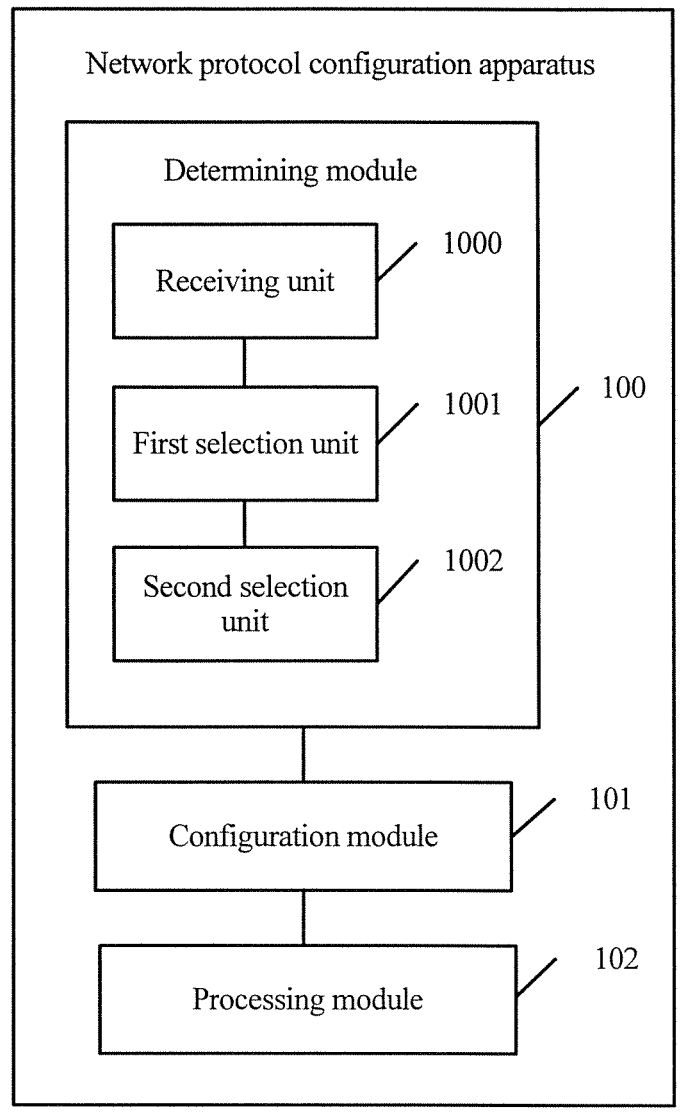
FIG. 3 is a schematic structural diagram of still another network protocol configuration apparatus according to the present invention.

Referring to FIG. 3, FIG. 3 is a schematic structural diagram of still another network protocol configuration apparatus according to an embodiment of the present invention. The network protocol configuration apparatus shown in FIG. 3 is obtained by optimizing the network protocol configuration apparatus shown in FIG. 1. The network protocol configuration apparatus shown in FIG. 3 includes all the modules of the network protocol configuration apparatus in FIG. 1. For the determining module 100, the configuration module 101, and the processing module 102, refer to descriptions of FIG. 1, and details are not described herein again. The determining module 100 may include a receiving unit 1000, a first selection unit 1001, and a second selection unit 1002.

The receiving unit 1000 is configured to receive a control instruction, where the control instruction includes a target application program identifier, and a target application program identified by the target application program identifier is used to process the data by using the target network protocol.

In an optional implementation manner, when target network protocol processing needs to be performed on the data by using the target network protocol, a control-plane node determines, according to a user or service requirement, an identifier of a target application program that implements the target protocol processing. Target network protocol processing may be performed, by using the target network protocol, on the data by executing the target application program. Specifically, a manner used by the control-plane node to deliver the target application program identifier may be: transmitting a control instruction, encapsulating the target application program identifier into the control instruction, and after receiving the control instruction, obtaining, by the receiving unit 1000 at the local end, the target application program identifier from the control instruction by means of parsing.

Further, before receiving the control instruction transmitted by the control-plane node, a local end further needs to establish, based on at least one of an OpenRadio protocol or an OpenFlow protocol, a data connection to the control-plane node. A main function of the data connection is to establish a control relationship between the local end and the control-plane node. After the control relationship is established, the receiving unit 1000 at the local end receives the control instruction transmitted by the control-plane node.

The first selection unit 1001 is configured to select the target application program from an application program set according to the target application program identifier, and execute the target application program.

In an optional implementation manner, the first selection unit 1001 selects, from the application program set, the target application program according to the target application program identifier obtained by means of parsing, and executes the application program. It should be noted that the application program set includes application programs corresponding to various network protocols. Implementation of various network protocols on an access network side is used as an example for description herein. As shown in FIG. 4, the figure shows an application program set in a base station device. Network protocol processing implemented by application programs in the application program set is protocol processing corresponding to implementation of various wireless network protocols. As shown in the figure, the application program set includes an LTE application program, a UMTS application program, a 5G application program, a wireless network WIFI application program, and the like. In the application program set, each application program has an application program identifier, and the application program identifier is used to identify the application program. Application program identifiers are in a one-to-one correspondence with application programs. Therefore, the first selection unit 1001 may select the target application program from the application program set according to the target application program identifier. Invocation and parameter configuration of a function module in a function module set and corresponding protocol processing can be implemented by executing the target application program.

The second selection unit 1002 is configured to select, from a function module set by using the target application program, the at least one target function module configured to perform the target network protocol processing.

In an optional implementation manner, when the second selection unit 1002 executes the target application program, the target application program can select, from the function module set, the at least one target function module configured to perform target network protocol processing. Implementation of a network protocol on the access network side is still used as an example for description herein. A specific implementation device may be a base station device or a terminal device. The base station device or the terminal device may include a function module set. The base station device is used as an example for description herein. As shown in FIG. 4, a function module set of the base station device may include a Turbo code encoding module that performs encoding processing, a convolutional code encoding module, a hybrid automatic repeat request module, a segmentation module, an authentication module, an encoding module, a modulation module, an orthogonal frequency division multiple access (Orthogonal Frequency Division Multiple Access, OFDMA) module, a Code Division Multiple Access (Code Division Multiple Access, CDMA) module, a transmission module, and the like. Each function module in the function module set may support a single protocol, or may support multiple protocols. When a function module supports a single protocol, the function module is a dedicated function module of the protocol; when a function module supports multiple protocols, the function module is a public function module of the multiple protocols. A function module may be a logic circuit/chip, a radio frequency circuit, computer code, or a process in a virtual machine. When the second selection unit 1002 executes the target application program in the base station device, the target application program can select the at least one target function module configured to perform target protocol processing. The selected target function module may be one function module, or may be multiple function modules. The target network protocol herein may be a wireless network protocol. For example, when the LTE application program is executed in the base station device to perform encapsulation processing on service data, the second selection unit 1002 executes the LTE application program. The LTE application program can select a header compression module, the authentication module, the segmentation module, a channel mapping module, the Turbo code encoding module, the modulation module, the OFDMA module, the transmission module, and the like in the function module set of the base station device. Because at least one target function module is selected for a target network protocol, different target function modules may be selected for different target network protocols. For example, when encapsulation processing is performed on service data by using the UMTS protocol in the base station device, the UMTS application program selects a header compression module, the authentication module, the segmentation module, a channel mapping module, the Turbo code encoding module, the modulation module, a spread spectrum module, the transmission module, and the like in the function module set of the base station device. Because an orthogonal frequency division multiple access technology is used in the LTE protocol, the OFDMA module needs to be selected. Because a spread spectrum communications technology is used in the UMTS protocol, the spread spectrum module needs to be selected.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Figure 5:
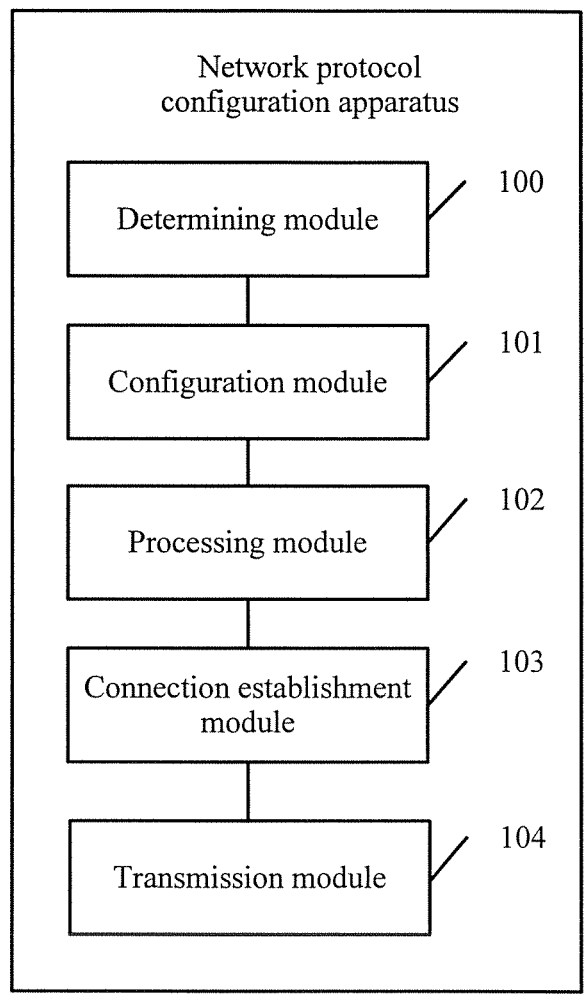
FIG. 5 is a schematic structural diagram of still another network protocol configuration apparatus according to the present invention.

Referring to FIG. 5, FIG. 5 is a schematic structural diagram of still another network protocol configuration apparatus according to an embodiment of the present invention. The network protocol configuration apparatus shown in FIG. 5 is obtained by optimizing the network protocol configuration apparatus shown in FIG. 1. The network protocol configuration apparatus shown in FIG. 5 includes all the modules of the network protocol configuration apparatus in FIG. 1. For the determining module 100, the configuration module 101, and the processing module 102, refer to descriptions of FIG. 1, and details are not described herein again. Further, the network protocol configuration apparatus in this embodiment may further include a connection establishment module 103 and a transmission module 104.

The connection establishment module 103 is configured to establish, based on a specific protocol, a data connection to the target network protocol configuration apparatus identified by the device identifier, where the specific protocol includes at least one of a common public radio interface protocol or a common public physical interface protocol.

In an optional implementation manner, when a corresponding air interface service needs to be implemented on the data, multiple network protocol configuration apparatuses need to cooperate. For example, when corresponding network protocol processing needs to be performed on the data according to a network protocol, a network protocol configuration apparatus at a local end and the target network protocol configuration apparatus need to jointly complete the processing. The local end implements, on the data, only processing functions of layers including a Packet Data Convergence Protocol layer, a Radio Link Control Protocol layer, a Media Access Control layer, and a physical layer, and the target network protocol configuration apparatus needs to further process data processed by the local end, for example, perform radio frequency processing on the processed data. Therefore, the target network protocol configuration apparatus activates a radio frequency function module in a function module set of the target network protocol configuration apparatus, performs corresponding parameter configuration and physical resource allocation on the radio frequency function module, and the like, to further process the data processed by the local end, so as to complete entire processing that needs to be implemented by the target network protocol.

Specifically, a control-plane node encapsulates the device identifier of the target network protocol configuration apparatus into a control instruction. The network protocol configuration apparatus at the local end receives the control instruction, and obtains, by means of parsing, the device identifier of target network protocol configuration included in the control instruction. The connection establishment module 103 may establish, based on the common public radio interface (Common Public Radio Interface, CPRI) protocol and the common public physical interface (Common Public Physical Interface, CPPI) protocol, the data connection to the target network protocol configuration apparatus identified by the device identifier, or the connection establishment module 103 may establish, based on the CPRI protocol or the CPPI protocol, the data connection to the target network protocol configuration apparatus. A main function of the data connection is to prepare for subsequent data transmission.

The transmission module 104 is configured to transmit processed data to the target network protocol configuration apparatus.

In an optional implementation manner, the transmission module 104 transmits, to the target network protocol configuration apparatus by using the established data connection, the data on which target protocol processing has been performed. After receiving the processed data, the target network protocol configuration apparatus further processes the data. The target network protocol configuration apparatus also includes a function module set. Protocol processing completed by the local end and the target network protocol configuration apparatus may be: jointly implementing the processing functions of the layers including the Packet Data Convergence Protocol layer, the Radio Link Control Protocol layer, the Media Access Control layer, and the physical layer and a radio frequency function on service data according to a target network protocol. The local end may implement only the processing functions of the layers including the Packet Data Convergence Protocol layer, the Radio Link Control Protocol layer, the Media Access Control layer, and the physical layer, and the target network protocol configuration apparatus implements the radio frequency function. It should be noted that the target network protocol configuration apparatus may also perform forwarding routing processing on service data processed by the local end.

Further, the target network protocol configuration apparatus and the local end may be shown to the outside in multiple manners. For example, the target network protocol configuration apparatus and the local end may be integrated into a base station, or the target network protocol configuration apparatus and the local end are separately set as independent apparatuses. For different data, processing processes implemented by the local end and the target network protocol configuration apparatus may be different, but the local end and the target network protocol configuration apparatus may jointly implement the functions of the layers on the data according to a target network protocol. For example, for first data, the local end implements the processing functions of the layers including the Packet Data Convergence Protocol layer, the Radio Link Control Protocol layer, the Media Access Control layer, and the physical layer and the radio frequency function. In this case, the target network protocol configuration apparatus does not need to perform processing. For second data, the local end implements only the processing functions of the layers including the Packet Data Convergence Protocol layer, the Radio Link Control Protocol layer, the Media Access Control layer, and the physical layer, and the target network protocol configuration apparatus implements the radio frequency function. In this case, the target network protocol configuration apparatus needs to cooperate.

Further, the control-plane node determines whether the target network protocol configuration apparatus needs to further process the data on which target network protocol processing has been performed by the local end. The control-plane node indicates, to the local end and the target network protocol configuration apparatus by sending a control instruction, a processing process that needs to be performed.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Figure 6:
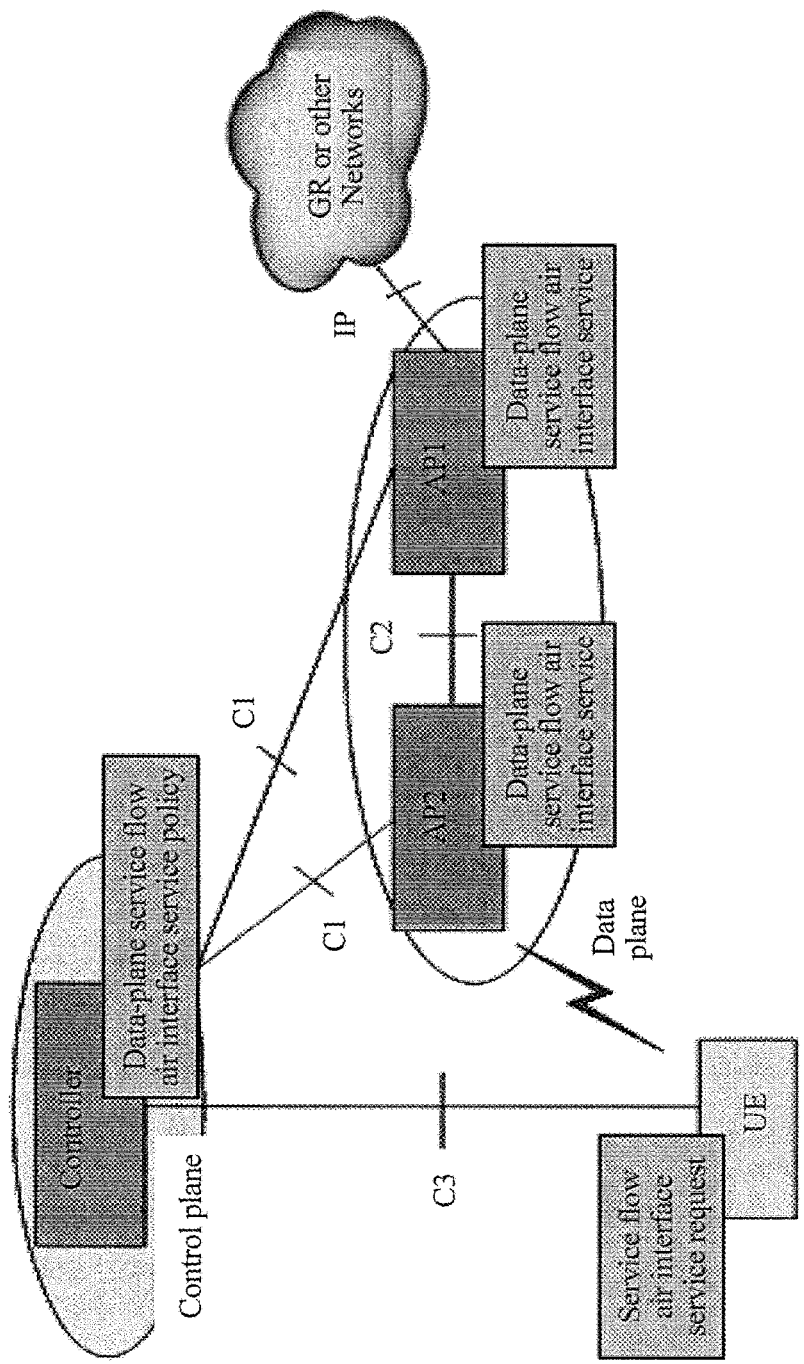
FIG. 6 is a diagram of an application scenario of a network protocol configuration apparatus according to the present invention.

Referring to FIG. 6, FIG. 6 is a diagram of an application scenario of a network protocol configuration apparatus according to the present invention.

In this embodiment of the present invention, UE is a terminal device, and AP1 and AP2 are wireless access points. The terminal device UE and the wireless access points AP1 and AP2 are a user plane, and a control plane is a controller. The network protocol configuration apparatus and the network protocol configuration method in the present invention may be applicable to the wireless access points AP1 and AP2 or the terminal device UE. For example, in this embodiment of the present invention, the apparatus at a local end may correspond to the wireless access point AP1, and a target network protocol configuration apparatus may correspond to the wireless access point AP2.

The terminal device UE exchanges information with the control plane by using a C3 interface, and the control plane exchanges information with the wireless access points AP1 and AP2 by using C1 interfaces. The wireless access point AP1 exchanges information with the wireless access point AP2 by using a C2 interface.

For different data, the wireless access point AP1 and the wireless access point AP2 may be shown to the outside in different manners. For example, for first data, the wireless access point AP1 implements processing functions of layers including a Packet Data Convergence Protocol layer, a Radio Link Control Protocol layer, a Media Access Control layer, and a physical layer and a radio frequency function, and the wireless access point AP2 is in an idle state. For second data, the wireless access point AP1 implements the processing functions of the layers including the Packet Data Convergence Protocol layer, the Radio Link Control Protocol layer, the Media Access Control layer, and the physical layer, and the wireless access point AP2 implements only the radio frequency function. It should be noted that the wireless access point AP1 and the wireless access point AP2 may be physically integrated into a device, for example, integrated into a base station, or may be separately set as independent devices.

After receiving an air interface service request of the terminal device UE, the control plane formulates an air interface service policy for service data of the terminal device, that is, determines a target network protocol that needs to be used for the service data of the terminal device, and sends the air interface service policy to the corresponding wireless access points AP1 and AP2. The wireless access point AP1 and the wireless access point AP2 select a target function module configured to perform the target protocol processing, and perform corresponding configuration on the target function module by using a preset target configuration solution. Finally, the configured function module performs corresponding target network protocol processing on the service data.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Figure 7:
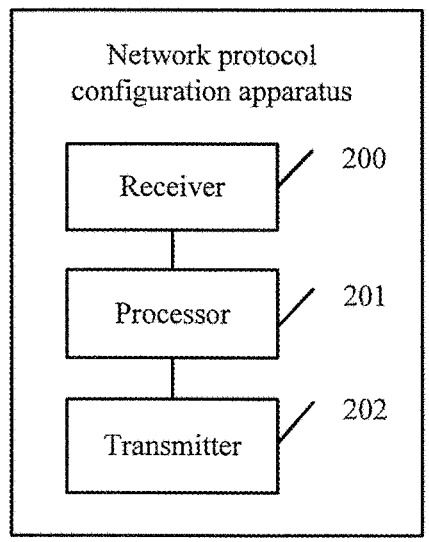
FIG. 7 is a schematic structural diagram of still another network protocol configuration apparatus according to the present invention.

Referring to FIG. 7, FIG. 7 is a schematic structural diagram of still another network protocol configuration apparatus according to an embodiment of the present invention. The network protocol configuration apparatus may include: a receiver 200, a processor 201, and a transmitter 202. Both the receiver 200 and the transmitter 202 are connected to the processor 201.

The processor 201 is configured to determine at least one target function module according to a target network protocol, where the target network protocol is a protocol used for data processing.

Optionally, when target network protocol processing needs to be performed on data by using a target network protocol, at least one target function module is determined according to the target network protocol. A trigger condition for target network protocol processing that needs to be performed on the data by using the target network protocol may be a user or service requirement. The user or service requirement may be determined by a user plane at a local end according to an air interface service policy delivered by a control-plane node, and target network protocol processing that needs to be performed on the data by using the target network protocol may also be determined by a user-plane node at the local end according to the air interface service policy delivered by the control-plane node. The air interface service policy is formulated by the control-plane node according to a wireless network service request of user equipment. The service request includes related attribute information of a service required by the user equipment, such as a service identifier, an identifier of a source network access device that sends service data, an identifier of a target network access device that receives the service data, a service type, and expected quality of service. The control-plane node determines the air interface service policy according to a related attribute of the service in the wireless network service request and with reference to an event prestored in the control-plane node, such as topology information of network access devices and/or state information of the network access devices and/or service subscription information of the network access devices. The air interface service policy may include an identifier of a network access device that executes the policy (it should be noted that if the local end and the control-plane node are integrated into one device, the identifier of the network access device does not need to be included) and an identifier of a protocol application program that executes the policy and that is in the network access device, or the air interface service policy may include a target function module that needs to be invoked/activated to perform target protocol processing in the corresponding target network protocol, invoking/activation steps of target function modules, parameter configurations during invoking/activation of the target function modules, and sizes of physical resources of a network access device that are occupied when function modules are invoked/activated. When receiving the air interface service policy delivered by the control-plane node, the local end can determine, from the air interface service policy, that target network protocol processing needs to be performed on the data by using the target network protocol. A method for determining the at least one target function module may be: selecting, from a function module set, the at least one target function module configured to perform target network protocol processing. It should be noted that a target function module set includes all function modules that perform various types of network protocol processing. All types of protocol processing share one function module set, and function modules in the function module set may not be repeated, but each function module has a particular function.

Implementation of a network protocol on an access network side is used as an example for description herein. A specific implementation device may be a base station device or a terminal device. The base station device or the terminal device may include a function module set. The base station device is used as an example for description herein. As shown in FIG. 4, a function module set of the base station device may include a Turbo code encoding module that performs encoding processing, a convolutional code encoding module, a hybrid automatic repeat request module, a segmentation module, an authentication module, a modulation module, an orthogonal frequency division multiple access (Orthogonal Frequency Division Multiple Access, OFDMA) module, a Code Division Multiple Access (Code Division Multiple Access, CDMA) module, a transmission module, and the like. Each function module in the function module set may support a single protocol, or may support multiple protocols. When a function module supports a single protocol, the function module is a dedicated function module of the protocol; when a function module supports multiple protocols, the function module is a public function module of the multiple protocols. A function module may be a logic circuit/chip, a radio frequency circuit, computer code, or a process in a virtual machine. When target network protocol processing needs to be performed on data by using a target network protocol in the base station device, a target function module that performs target network protocol processing needs to be selected. The selected target function module may be one function module, or may be multiple function modules. The target network protocol herein may be a wireless network protocol. For example, when encapsulation processing is performed on data by using a 3.9G (Long Term Evolution, LTE) protocol in the base station device, a header compression module, the authentication module, the segmentation module, a channel mapping module, the Turbo code encoding module, the modulation module, the OFDMA module, the transmission module, and the like in the function module set of the base station device may be selected. Because a target function module is selected for a target network protocol, different target function modules may be selected for different target network protocols. For example, when encapsulation processing is performed on data by using a Mobile Telecommunications System (Universal Mobile Telecommunications System, UMTS) protocol in the base station device, a header compression module, the authentication module, the segmentation module, a channel mapping module, the Turbo code encoding module, the modulation module, a spread spectrum module, the transmission module, and the like in the function module set of the base station device may be selected. Because an orthogonal frequency division multiple access technology is used in the LTE protocol, the OFDMA module needs to be selected. Because a spread spectrum communications technology is used in the UMTS protocol, the spread spectrum module needs to be selected.

The processor 201 is further configured to configure the at least one target function module, where the at least one configured target function module is configured to process data according to the target network protocol.

Optionally, because one function module may support multiple network protocols, configurations of a same function module may be different in different network protocols. Therefore, when target network protocol processing needs to be performed on the data by using the target network protocol, the at least one selected target function module needs to be configured according to a target configuration solution. The target configuration solution corresponds to the target network protocol, and therefore, the configured target function module processes the data according to the target network protocol.

Specifically, a configuration method for configuring the target function module may be: invoking an application program corresponding to the target network protocol, and configuring, by the application program, the target function module by using a preset target configuration solution. A specific configuration solution may be: activating the target function module, then performing parameter configuration on the target function module, allocating a physical resource for running the target function module, when there is more than one target function module, connecting the target function module in tandem according to a tandem connection sequence corresponding to the target network protocol, and the like. After the target function module is configured, the target function module may perform corresponding target network protocol processing on the data according to the target network protocol.

The processor 201 is further configured to process the data by using the at least one configured target function module.

Optionally, a specific method for processing the data by using the at least one configured target function module may be: inputting the data into the configured target function module, and performing, by the target function module, target network protocol processing on the data by using the target network protocol, and outputting processed data.

In an optional implementation manner, the processor 201 is further configured to activate the at least one target function module according to the target network protocol.

Optionally, when at least one target function module needs to be invoked to process data, the at least one target function module first needs to be activated. The activation of a target function module is equivalent to enabling the target function module. When a function module is not used, the function module that is not used needs to be disabled, that is, the disabled function module does not receive or process any data. When a function module needs to be used, the function module is enabled, that is, the function module is activated. Because different target function modules are selected for different network protocols, a target function module needs to be activated according to an activation step that corresponds to the target network protocol and that is used to activate the target function module.

The processor 201 is further configured to determine a parameter configuration of the target function module, where the parameter configuration is used to enable the target function module to process the data by using the target network protocol.

Optionally, because parameter configurations of a function module are different in different network protocols, when the data needs to be processed by using the target network protocol, the parameter configuration of the target function module needs to be determined, so that the configured target function module can process the data by using the target network protocol. Specifically, determining the parameter configuration of the target function module may be: determining a preset parameter configuration solution corresponding to the target network protocol, to perform parameter configuration on the target function module. The network protocol herein may be a wireless network protocol, that is, specific implementation of the network protocol on the access network side. A specific implementation device may be a base station or a terminal device. Because the parameter configuration solution corresponds to the target network protocol, after the target function module is configured, the target function module may process the data by using the target network protocol. Even for a same function module, parameter configuration solutions used for different target network protocols may be different. In this embodiment of the present invention, different target network protocols are implemented mainly by using different solutions for configuring a function module in the function module set, and backward compatibility of a protocol is also implemented in this manner. When a new protocol appears or a protocol is updated, only a quantity of function modules included in the function module set needs to be increased or only a parameter configuration solution in an original function module needs to be changed.

Specifically, a parameter configuration solution of the Turbo code encoding module included in the function module set of the base station device is used as an example for description herein. Whether the network protocol is the LTE protocol or the UMTS protocol, the Turbo code encoding module is selected as the target function module. When parameter configuration is performed on the Turbo code encoding module, if the target network protocol is the LTE protocol, the processor 201 sets a bit rate parameter in the Turbo code encoding module to a ⅘ bit rate and sets a code length parameter to 20 bits; if the target network protocol is the UMTS protocol, the determining unit 1011 sets a bit rate parameter in the Turbo code encoding module to a ½ bit rate and sets a code length parameter to 15 bits. Other target function modules in the LTE protocol and the UMTS protocol are also configured according to corresponding parameter configuration solutions corresponding to the protocols. For example, the determining unit 1011 also configures a radio frequency module according to a transmit frequency band corresponding to the target network protocol. Therefore, the configured target function module can process the data by using the target network protocol corresponding to the configuration solution. Corresponding configuration is also performed on another target function module in the network protocol.

The processor 201 is further configured to allocate a fragment physical resource to the target function module.

Optionally, the function module performs resource segmentation processing (such as virtualization and physical entity backup). Therefore, when target network protocol processing is performed on the data by using the target network protocol, a corresponding fragment physical resource needs to be allocated to the target function module. The physical resource may be a size of memory occupied when the target function module runs and a location of the memory, or may be a circuit resource occupied when the target function module is invoked, for example, a quantity of single-chip microcomputers. A specific implementation method for allocating the fragment physical resource to the target function module by using a preset allocation policy corresponding to the target network protocol is described herein by using an example. For example, when a fragment physical resource is allocated to the Turbo code encoding module in the function module set of the base station device, because encoding is performed mainly by a single-chip microcomputer during encoding processing, when the target network protocol is the LTE protocol, two single-chip microcomputers may be allocated to the Turbo code encoding module among target function modules of the LTE protocol, to perform encoding; when the target network protocol is the UMTS protocol, three single-chip microcomputers may be allocated to the Turbo code encoding module among target function modules of the UMTS protocol, to perform encoding. Physical resources are also allocated to other target function modules in the LTE protocol and the UMTS protocol according to corresponding fragment physical resource allocation policies corresponding to respective protocols.

The processor 201 is further configured to connect the target function module in tandem according to a tandem connection sequence corresponding to the target network protocol.

Optionally, each network protocol has a tandem connection sequence of target function modules that corresponds to the network protocol. Because data processing procedures in network protocols may be the same, tandem connection sequences in some network protocols may be the same. Further, because determined target function modules may be different, tandem connection sequences may also be different. Therefore, each network protocol has a tandem connection sequence of target function modules that corresponds to the network protocol.

Specifically, that encapsulation processing is performed on the data by using the LTE protocol in the base station device is used as an example for description herein. The at least one selected target function module is the header compression module, the authentication module, the segmentation module, the channel mapping module, the Turbo code encoding module, the modulation module, the OFDMA module, the transmission module, and the like in the function module set of the base station device. The target function modules are tandem-connected according to the following sequence: the header compression module, the authentication module, the segmentation module, the channel mapping module, the Turbo code encoding module, the modulation module, the OFDMA module, and the transmission module. It should be noted that the tandem connection sequence indicates a data processing sequence.

In an optional implementation manner, the processor 201 is further configured to successively input to-be-processed data into the at least one tandem-connected target function module, to process the data.

Optionally, after the at least one target function module is activated, configured, and tandem-connected, the target function module may perform target protocol processing on the data. Therefore, the data is successively input into the at least one tandem-connected target function module to perform target network protocol processing. It should be noted that a sequence in which the data is input into the tandem-connected target function modules should be the same as the sequence in which the target function modules are tandem-connected. Each target function module may implement corresponding target network protocol processing on the data.

In an optional implementation manner, the receiver 200 is configured to receive a control instruction, where the control instruction includes a target application program identifier, and a target application program identified by the target application program identifier is used to process the data by using the target network protocol.

Optionally, when target network protocol processing needs to be performed on the data by using the target network protocol, the control-plane node determines, according to the user or service requirement, an identifier of a target application program that implements the target protocol processing. Target network protocol processing may be performed, by using the target network protocol, on the data by executing the target application program. Specifically, a manner used by the control-plane node to deliver the target application program identifier may be: transmitting a control instruction, encapsulating the target application program identifier into the control instruction, and after the control instruction is received, obtaining the target application program identifier from the control instruction by means of parsing.

Further, before receiving the control instruction transmitted by the control-plane node, the local end further needs to establish, based on at least one of an OpenRadio protocol or an OpenFlow protocol, a data connection to the control-plane node. A main function of the data connection is to establish a control relationship between the local end and the control-plane node. After the control relationship is established, the local end receives the control instruction transmitted by the control-plane node.

The processor 201 is further configured to select the target application program from an application program set according to the target application program identifier, and execute the target application program.

Optionally, the target application program is selected from an application program set according to the target application program identifier obtained by means of parsing, and the application program is executed. It should be noted that the application program set includes application programs corresponding to various network protocols. Implementation of various network protocols on the access network side is used as an example for description herein. As shown in FIG. 4, the figure shows an application program set in the base station device. Network protocol processing implemented by application programs in the application program set is protocol processing corresponding to implementation of various wireless network protocols. As shown in the figure, the application program set includes an LTE application program, a UMTS application program, a 5G application program, a wireless network WIFI application program, and the like. In the application program set, each application program has an application program identifier, and the application program identifier is used to identify the application program. Application program identifiers are in a one-to-one correspondence with application programs. Therefore, the target application program may be selected from the application program set according to the target application program identifier. Invocation and parameter configuration of a function module in the function module set and corresponding protocol processing can be implemented by executing the target application program.

The processor 201 is further configured to select, from a function module set by using the target application program, the at least one target function module configured to perform the target network protocol processing.

Optionally, when the processor executes the target application program, the target application program selects, from the function module set, the target function module configured to perform the target protocol processing. The target application program selects, from the function module set, the at least one target function module configured to perform target network protocol processing. Implementation of a network protocol on the access network side is still used as an example for description herein. A specific implementation device may be a base station device or a terminal device. The base station device or the terminal device may include a function module set. The base station device is used as an example for description herein. As shown in FIG. 4, the function module set of the base station device may include the Turbo code encoding module that performs encoding processing, the convolutional code encoding module, the hybrid automatic repeat request module, the segmentation module, an authentication module, the encoding module, the modulation module, the orthogonal frequency division multiple access (Orthogonal Frequency Division Multiple Access, OFDMA) module, the Code Division Multiple Access (Code Division Multiple Access, CDMA) module, the transmission module, and the like. Each function module in the function module set may support a single protocol, or may support multiple protocols. When a function module supports a single protocol, the function module is a dedicated function module of the protocol; when a function module supports multiple protocols, the function module is a public function module of the multiple protocols. A function module may be a logic circuit/chip, a radio frequency circuit, computer code, or a process in a virtual machine. When the target application program is executed in the base station device, the target application program can select the at least one target function module configured to perform the target protocol processing. The selected target function module may be one function module, or may be multiple function modules. The target network protocol herein may be a wireless network protocol. For example, when the LTE application program is executed in the base station device to perform encapsulation processing on service data, the LTE application program is executed. The LTE application program can select the header compression module, the authentication module, the segmentation module, the channel mapping module, the Turbo code encoding module, the modulation module, the OFDMA module, the transmission module, and the like in the function module set of the base station device. Because at least one target function module is selected for a target network protocol, different target function modules may be selected for different target network protocols. For example, when encapsulation processing is performed on service data by using the UMTS protocol in the base station device, the UMTS application program selects the header compression module, the authentication module, the segmentation module, the channel mapping module, the Turbo code encoding module, the modulation module, the spread spectrum module, the transmission module, and the like in the function module set of the base station device. Because an orthogonal frequency division multiple access technology is used in the LTE protocol, the OFDMA module needs to be selected. Because a spread spectrum communications technology is used in the UMTS protocol, the spread spectrum module needs to be selected.

In an optional implementation manner, if the control instruction includes configuration information used for establishing a data connection relationship with a target network protocol configuration apparatus, the configuration information includes a device identifier of the target network protocol configuration apparatus. The processor 201 is further configured to establish, based on a specific protocol, a data connection to the target network protocol configuration apparatus identified by the device identifier, where the specific protocol includes at least one of a common public radio interface protocol or a common public physical interface protocol.

Optionally, when a corresponding air interface service needs to be implemented on the data, multiple network protocol configuration apparatuses need to cooperate. For example, when corresponding network protocol processing needs to be performed on the data according to a network protocol, the network protocol configuration apparatus at the local end and the target network protocol configuration apparatus need to jointly complete the processing. The local end implements, on the data, only processing functions of layers including a Packet Data Convergence Protocol layer, a Radio Link Control Protocol layer, a Media Access Control layer, and a physical layer, and the target network protocol configuration apparatus needs to further process data processed by the local end, for example, perform radio frequency processing on the processed data. Therefore, the target network protocol configuration apparatus activates a radio frequency function module in a function module set of the target network protocol configuration apparatus, performs corresponding parameter configuration and physical resource allocation on the radio frequency function module, and the like, to further process the data processed by the local end, so as to complete entire processing that needs to be implemented by the target network protocol.

Specifically, the control-plane node encapsulates the device identifier of the target network protocol configuration apparatus into the control instruction. The network protocol configuration apparatus at the local end receives the control instruction, and obtains, by means of parsing, the device identifier of target network protocol configuration included in the control instruction. The data connection to the target network protocol configuration apparatus identified by the device identifier may be established based on the Common Public Radio Interface (Common Public Radio Interface, CPRI) protocol and the Common Public Physical Interface (Common Public Physical Interface, CPPI) protocol, or the data connection to the target network protocol configuration apparatus may be established based on the CPRI protocol or the CPPI protocol. A main function of the data connection is to prepare for subsequent data transmission.

The transmitter 202 is configured to transmit processed data to the target network protocol configuration apparatus.

Optionally, the data on which target protocol processing has been performed is transmitted to the target network protocol configuration apparatus by using the established data connection. After receiving the processed data, the target network protocol configuration apparatus further processes the data. The target network protocol configuration apparatus also includes a function module set. Protocol processing completed by the local end and the target network protocol configuration apparatus may be: jointly implementing the processing functions of the layers including the Packet Data Convergence Protocol layer, the Radio Link Control Protocol layer, the Media Access Control layer, and the physical layer and a radio frequency function on service data according to a target network protocol. The local end may implement only the processing functions of the layers including the Packet Data Convergence Protocol layer, the Radio Link Control Protocol layer, the Media Access Control layer, and the physical layer, and the target network protocol configuration apparatus implements the radio frequency function. It should be noted that the target network protocol configuration apparatus may also perform forwarding routing processing on service data processed by the local end.

Further, the target network protocol configuration apparatus and the local end may be shown to the outside in multiple manners. For example, the target network protocol configuration apparatus and the local end may be integrated into a base station, or the target network protocol configuration apparatus and the local end are separately set as independent apparatuses. For different data, processing processes implemented by the local end and the target network protocol configuration apparatus may be different, but the local end and the target network protocol configuration apparatus may jointly implement the functions of the layers on the data according to a target network protocol. For example, for first data, the local end implements the processing functions of the layers including the Packet Data Convergence Protocol layer, the Radio Link Control Protocol layer, the Media Access Control layer, and the physical layer and the radio frequency function. In this case, the target network protocol configuration apparatus does not need to perform processing. For second data, the local end implements only the processing functions of the layers including the Packet Data Convergence Protocol layer, the Radio Link Control Protocol layer, the Media Access Control layer, and the physical layer, and the target network protocol configuration apparatus implements the radio frequency function. In this case, the target network protocol configuration apparatus needs to cooperate.

Further, the control-plane node determines whether the target network protocol configuration apparatus needs to further process the data on which target network protocol processing has been performed by the local end. The control-plane node indicates, to the local end and the target network protocol configuration apparatus by sending a control instruction, a processing process that needs to be performed.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Figure 8:
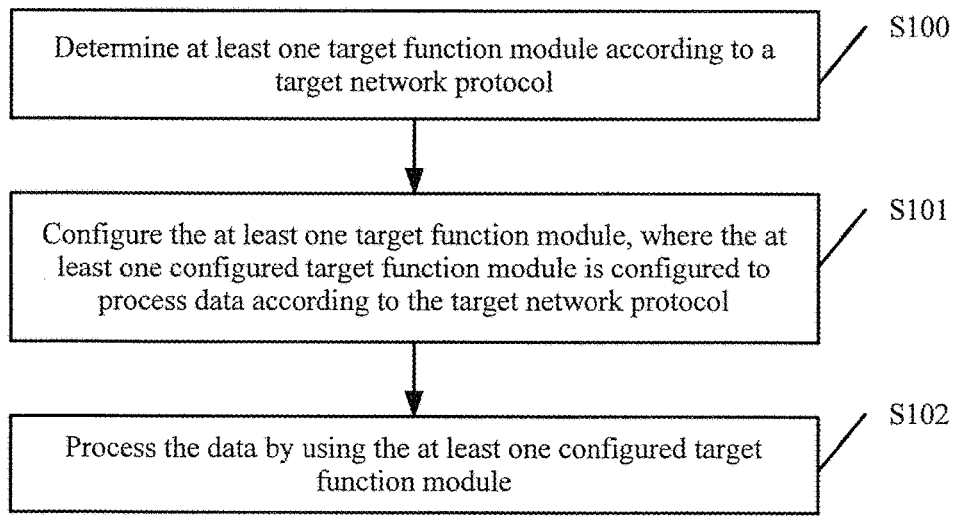
FIG. 8 is a schematic flowchart of a network protocol configuration method according to the present invention.
Figure 9:
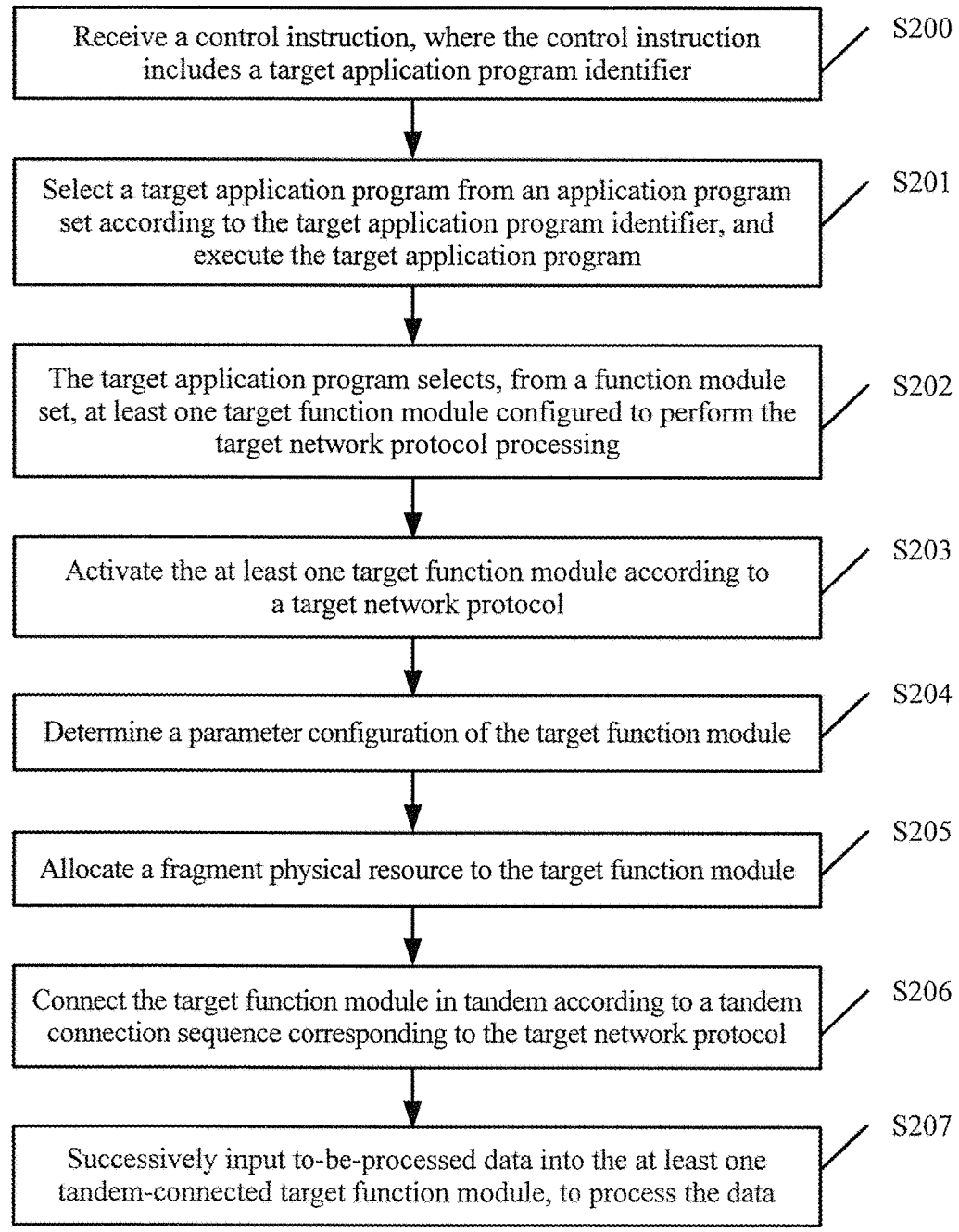
FIG. 9 is a schematic flowchart of another network protocol configuration method according to the present invention.
Figure 10:
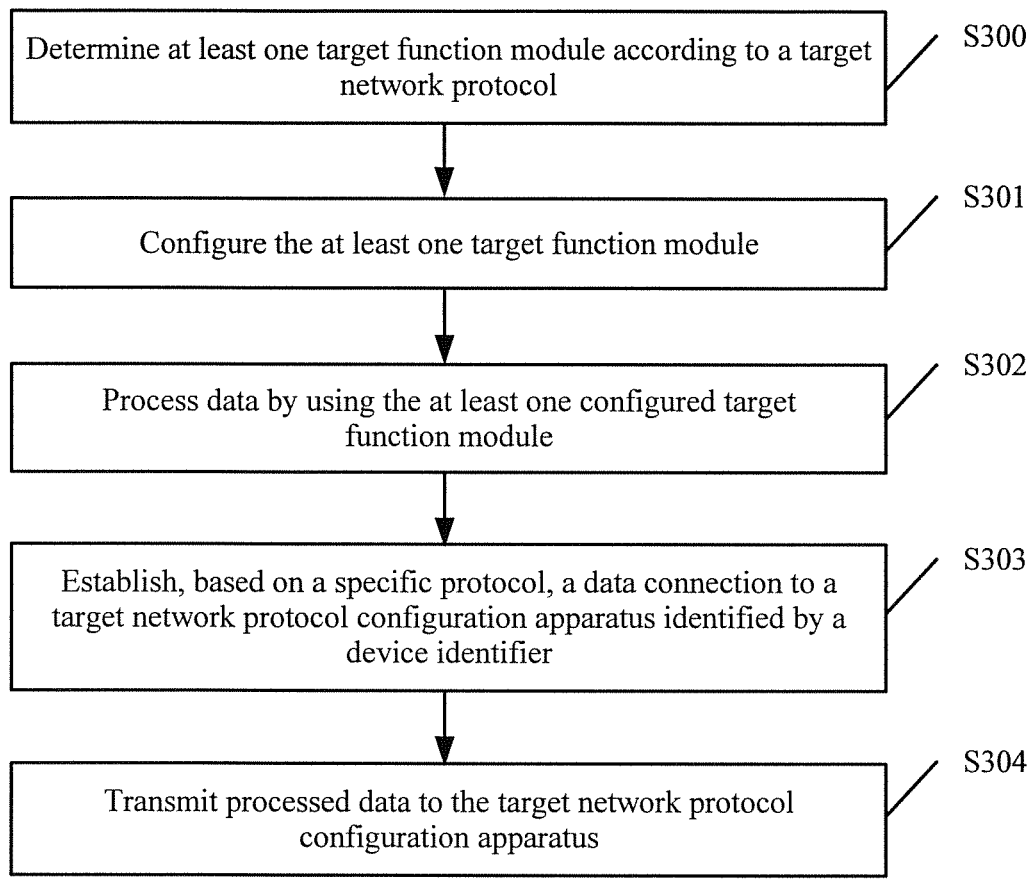
FIG. 10 is a schematic flowchart of still another network protocol configuration method according to the present invention.

The following describes the network protocol configuration method provided in the embodiments of the present invention in detail with reference to FIG. 8 to FIG. 10.

Referring to FIG. 8, FIG. 8 is a schematic flowchart of a network protocol configuration method according to an embodiment of the present invention. The method may include the following step S100 to step S102.

S100: Determine at least one target function module according to a target network protocol, where the target network protocol is a protocol used for data processing.

In an embodiment, when target network protocol processing needs to be performed on data by using a target network protocol, at least one target function module is determined according to the target network protocol. A trigger condition for target network protocol processing that needs to be performed on the data by using the target network protocol may be a user or service requirement. The user or service requirement may be determined by a user plane at a local end according to an air interface service policy delivered by a control-plane node, and target network protocol processing that needs to be performed on the data by using the target network protocol may also be determined by a user-plane node at the local end according to the air interface service policy delivered by the control-plane node. The air interface service policy is formulated by the control-plane node according to a wireless network service request of user equipment. The service request includes related attribute information of a service required by the user equipment, such as a service identifier, an identifier of a source network access device that sends service data, an identifier of a target network access device that receives the service data, a service type, and expected quality of service. The control-plane node determines the air interface service policy according to a related attribute of the service in the wireless network service request and with reference to an event prestored in the control-plane node, such as topology information of network access devices and/or state information of the network access devices and/or service subscription information of the network access devices. The air interface service policy may include an identifier of a network access device that executes the policy (it should be noted that if the local end and the control-plane node are integrated into one device, the identifier of the network access device does not need to be included) and an identifier of a protocol application program that executes the policy and that is in the network access device, or the air interface service policy may include a target function module that needs to be invoked/activated to perform target protocol processing in the corresponding target network protocol, invoking/activation steps of target function modules, parameter configurations during invoking/activation of the target function modules, and sizes of physical resources of a network access device that are occupied when function modules are invoked/activated. When receiving the air interface service policy delivered by the control-plane node, the local end can determine, from the air interface service policy, that target network protocol processing needs to be performed on the data by using the target network protocol. A method for determining the at least one target function module may be: selecting, from a function module set, the at least one target function module configured to perform target network protocol processing. It should be noted that a target function module set includes all function modules that perform various types of network protocol processing. All types of protocol processing share one function module set, and function modules in the function module set may not be repeated, but each function module has a particular function.

Implementation of a network protocol on an access network side is used as an example for description herein. A specific implementation device may be a base station device or a terminal device. The base station device or the terminal device may include a function module set. The base station device is used as an example for description herein. As shown in FIG. 4, a function module set of the base station device may include a Turbo code encoding module that performs encoding processing, a convolutional code encoding module, a hybrid automatic repeat request module, a segmentation module, an authentication module, a modulation module, an orthogonal frequency division multiple access (Orthogonal Frequency Division Multiple Access, OFDMA) module, a Code Division Multiple Access (Code Division Multiple Access, CDMA) module, a transmission module, and the like. Each function module in the function module set may support a single protocol, or may support multiple protocols. When a function module supports a single protocol, the function module is a dedicated function module of the protocol; when a function module supports multiple protocols, the function module is a public function module of the multiple protocols. A function module may be a logic circuit/chip, a radio frequency circuit, computer code, or a process in a virtual machine. When target network protocol processing needs to be performed on data by using a target network protocol in the base station device, a target function module that performs target network protocol processing needs to be selected. The selected target function module may be one function module, or may be multiple function modules. The target network protocol herein may be a wireless network protocol. For example, when encapsulation processing is performed on data by using a 3.9G (Long Term Evolution, LTE) protocol in the base station device, a header compression module, the authentication module, the segmentation module, a channel mapping module, the Turbo code encoding module, the modulation module, the OFDMA module, the transmission module, and the like in the function module set of the base station device may be selected. Because a target function module is selected for a target network protocol, different target function modules may be selected for different target network protocols. For example, when encapsulation processing is performed on data by using a Mobile Telecommunications System (Universal Mobile Telecommunications System, UMTS) protocol in the base station device, a header compression module, the authentication module, the segmentation module, a channel mapping module, the Turbo code encoding module, the modulation module, a spread spectrum module, the transmission module, and the like in the function module set of the base station device may be selected. Because an orthogonal frequency division multiple access technology is used in the LTE protocol, the OFDMA module needs to be selected. Because a spread spectrum communications technology is used in the UMTS protocol, the spread spectrum module needs to be selected.

S101: Configure the at least one target function module, where the at least one configured target function module is configured to process data according to the target network protocol.

In an embodiment, because one function module may support multiple network protocols, configurations of a same function module may be different in different network protocols. Therefore, when target network protocol processing needs to be performed on the data by using the target network protocol, the at least one selected target function module needs to be configured according to a target configuration solution. The target configuration solution corresponds to the target network protocol, and therefore, the configured target function module processes the data according to the target network protocol.

Specifically, a configuration method for configuring the target function module may be: invoking an application program corresponding to the target network protocol, and configuring, by the application program, the target function module by using a preset target configuration solution. A specific configuration solution may be: activating the target function module, then performing parameter configuration on the target function module, allocating a physical resource for running the target function module, when there is more than one target function module, connecting the target function module in tandem according to a tandem connection sequence corresponding to the target network protocol, and the like. After the target function module is configured, the target function module may perform corresponding target network protocol processing on the data according to the target network protocol.

S102: Process the data by using the at least one configured target function module.

In an embodiment, a specific method for processing the data by using the at least one configured target function module may be: inputting the data into the configured target function module, and performing, by the target function module, the target function module performs target network protocol processing on the data by using the target network protocol, and outputting processed data.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Referring to FIG. 9, FIG. 9 is a schematic flowchart of another network protocol configuration method according to an embodiment of the present invention. The method may include the following step S200 to step S207.

S200: Receive a control instruction, where the control instruction includes a target application program identifier, and a target application program identified by the target application program identifier is used to process the data by using the target network protocol.

In an optional implementation manner, when target network protocol processing needs to be performed on the data by using the target network protocol, a control-plane node determines, according to a user or service requirement, an identifier of a target application program that implements the target protocol processing. Target network protocol processing may be performed, by using the target network protocol, on the data by executing the target application program. Specifically, a manner used by the control-plane node to deliver the target application program identifier may be: transmitting a control instruction, encapsulating the target application program identifier into the control instruction, and after the control instruction is received, obtaining the target application program identifier from the control instruction by means of parsing.

Further, before receiving the control instruction transmitted by the control-plane node, a local end further needs to establish, based on at least one of an OpenRadio protocol or an OpenFlow protocol, a data connection to the control-plane node. A main function of the data connection is to establish a control relationship between the local end and the control-plane node. After the control relationship is established, the local end receives the control instruction transmitted by the control-plane node.

S201: Select the target application program from an application program set according to the target application program identifier, and execute the target application program.

In an optional implementation manner, the target application program is selected from the application program set according to the target application program identifier obtained by means of parsing, and the application program is executed. It should be noted that the application program set includes application programs corresponding to various network protocols. Implementation of various network protocols on an access network side is used as an example for description herein. As shown in FIG. 4, the figure shows an application program set in a base station device. Network protocol processing implemented by application programs in the application program set is protocol processing corresponding to implementation of various wireless network protocols. As shown in the figure, the application program set includes an LTE application program, a UNTS application program, a 5G application program, a wireless network WIFI application program, and the like. In the application program set, each application program has an application program identifier, and the application program identifier is used to identify the application program. Application program identifiers are in a one-to-one correspondence with application programs. Therefore, the target application program may be selected from the application program set according to the target application program identifier. Invocation and parameter configuration of a function module in a function module set and corresponding protocol processing can be implemented by executing the target application program.

S202: The target application program selects, from a function module set, the at least one target function module configured to perform the target network protocol processing.

In an optional implementation manner, when the target application program is executed, the target application program selects, from the function module set, the target function module configured to perform target protocol processing. Implementation of a network protocol on the access network side is still used as an example for description herein. A specific implementation device may be a base station device or a terminal device. The base station device or the terminal device may include a function module set. The base station device is used as an example for description herein. As shown in FIG. 4, a function module set of the base station device may include a Turbo code encoding module that performs encoding processing, a convolutional code encoding module, a hybrid automatic repeat request module, a segmentation module, an authentication module, an encoding module, a modulation module, an orthogonal frequency division multiple access (Orthogonal Frequency Division Multiple Access, OFDMA) module, a Code Division Multiple Access (Code Division Multiple Access, CDMA) module, a transmission module, and the like. Each function module in the function module set may support a single protocol, or may support multiple protocols. When a function module supports a single protocol, the function module is a dedicated function module of the protocol; when a function module supports multiple protocols, the function module is a public function module of the multiple protocols. A function module may be a logic circuit/chip, a radio frequency circuit, computer code, or a process in a virtual machine. When the target application program is executed in the base station device, the target application program can select the at least one target function module configured to perform the target protocol processing. The selected target function module may be one function module, or may be multiple function modules. The target network protocol herein may be a wireless network protocol. For example, when the LTE application program is executed in the base station device to perform encapsulation processing on service data, the LTE application program is executed. The LTE application program can select a header compression module, the authentication module, the segmentation module, a channel mapping module, the Turbo code encoding module, the modulation module, the OFDMA module, the transmission module, and the like in the function module set of the base station device. Because at least one target function module is selected for a target network protocol, different target function modules may be selected for different target network protocols. For example, when encapsulation processing is performed on service data by using the UNITS protocol in the base station device, the UMTS application program selects a header compression module, the authentication module, the segmentation module, a channel mapping module, the Turbo code encoding module, the modulation module, a spread spectrum module, the transmission module, and the like in the function module set of the base station device. Because an orthogonal frequency division multiple access technology is used in the LTE protocol, the OFDMA module needs to be selected. Because a spread spectrum communications technology is used in the UMTS protocol, the spread spectrum module needs to be selected.

S203: Activate the at least one target function module according to the target network protocol.

In an optional implementation manner, when at least one target function module needs to be invoked to process data, the at least one target function module first needs to be activated. The activation of a target function module is equivalent to enabling the target function module. When a function module is not used, the function module that is not used needs to be disabled, that is, the disabled function module does not receive or process any data. When a function module needs to be used, the function module is enabled, that is, the function module is activated. Because different target function modules are selected for different network protocols, a target function module needs to be activated according to an activation step that corresponds to the target network protocol and that is used to activate the target function module.

S204: Determine a parameter configuration of the target function module, where the parameter configuration is used to enable the target function module to process the data by using the target network protocol.

In an optional implementation manner, because parameter configurations of a function module are different in different network protocols, when the data needs to be processed by using the target network protocol, the parameter configuration of the target function module needs to be determined, so that the configured target function module can process the data by using the target network protocol. Specifically, determining the parameter configuration of the target function module may be: determining a preset parameter configuration solution corresponding to the target network protocol, to perform parameter configuration on the target function module. The network protocol herein may be a wireless network protocol, that is, specific implementation of the network protocol on the access network side. A specific implementation device may be a base station or a terminal device. Because the parameter configuration solution corresponds to the target network protocol, after the target function module is configured, the target function module may process the data by using the target network protocol. Even for a same function module, parameter configuration solutions used for different target network protocols may be different. In this embodiment of the present invention, different target network protocols are implemented mainly by using different solutions for configuring a function module in the function module set, and backward compatibility of a protocol is also implemented in this manner. When a new protocol appears or a protocol is updated, only a quantity of function modules included in the function module set needs to be increased or only a parameter configuration solution in an original function module needs to be changed.

Specifically, a parameter configuration solution of the Turbo code encoding module included in the function module set of the base station device is used as an example for description herein. Whether the network protocol is an LTE protocol or a UMTS protocol, the Turbo code encoding module is selected as the target function module. When parameter configuration is performed on the Turbo code encoding module, if the target network protocol is the LTE protocol, the determining unit 1011 sets a bit rate parameter in the Turbo code encoding module to a ⅘ bit rate and sets a code length parameter to 20 bits; if the target network protocol is the UMTS protocol, the determining unit 1011 sets a bit rate parameter in the Turbo code encoding module to a ½ bit rate and sets a code length parameter to 15 bits. Other target function modules in the LTE protocol and the UMTS protocol are also configured according to corresponding parameter configuration solutions corresponding to the protocols. For example, the determining unit 1011 also configures a radio frequency module according to a transmit frequency band corresponding to the target network protocol. Therefore, the configured target function module can process the data by using the target network protocol corresponding to the configuration solution. Corresponding configuration is also performed on another target function module in the network protocol.

S205: Allocate a fragment physical resource to the target function module.

In an optional implementation manner, the function module performs resource segmentation processing (such as virtualization and physical entity backup). Therefore, when target network protocol processing is performed on the data by using the target network protocol, a corresponding fragment physical resource needs to be allocated to the target function module. The physical resource may be a size of memory occupied when the target function module runs and a location of the memory, or may be a circuit resource occupied when the target function module is invoked, for example, a quantity of single-chip microcomputers. A specific implementation method for allocating the fragment physical resource to the target function module by using a preset allocation policy corresponding to the target network protocol is described herein by using an example. For example, when a fragment physical resource is allocated to the Turbo code encoding module in the function module set of the base station device, because encoding is performed mainly by a single-chip microcomputer during encoding processing, when the target network protocol is the LTE protocol, two single-chip microcomputers may be allocated to the Turbo code encoding module among target function modules of the LTE protocol, to perform encoding; when the target network protocol is the UMTS protocol, three single-chip microcomputers may be allocated to the Turbo code encoding module among target function modules of the UMTS protocol, to perform encoding. Physical resources are also allocated to other target function modules in the LTE protocol and the UMTS protocol according to corresponding fragment physical resource allocation policies corresponding to respective protocols.

S206: Connect the target function module in tandem according to a tandem connection sequence corresponding to the target network protocol.

In an optional implementation manner, each network protocol has a tandem connection sequence of target function modules that corresponds to the network protocol. Because data processing procedures in network protocols may be the same, tandem connection sequences in some network protocols may be the same. Further, because determined target function modules may be different, tandem connection sequences may also be different. Therefore, each network protocol has a tandem connection sequence of target function modules that corresponds to the network protocol.

Specifically, that encapsulation processing is performed on the data by using the LTE protocol in the base station device is used as an example for description herein. The at least one selected target function module is the header compression module, the authentication module, the segmentation module, the channel mapping module, the Turbo code encoding module, the modulation module, the OFDMA module, the transmission module, and the like in the function module set of the base station device. The target function modules are tandem-connected according to the following sequence: the header compression module, the authentication module, the segmentation module, the channel mapping module, the Turbo code encoding module, the modulation module, the OFDMA module, and the transmission module. It should be noted that the tandem connection sequence indicates a data processing sequence.

S207: Successively input to-be-processed data into the at least one tandem-connected target function module, to process the data.

In an optional implementation manner, after the at least one target function module is activated, configured, and tandem-connected, the target function module may perform target protocol processing on the data. Therefore, the data is successively input into the at least one tandem-connected target function module to perform target network protocol processing. It should be noted that a sequence in which the data is input into the tandem-connected target function modules should be the same as the sequence in which the target function modules are tandem-connected. Each target function module may implement corresponding target network protocol processing on the data.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

Referring to FIG. 10, FIG. 10 is a schematic flowchart of still another network protocol configuration method according to an embodiment of the present invention. The method may include the following step S300 to step S304.

S300: Determine at least one target function module according to a target network protocol, where the target network protocol is a protocol used for data processing.

For step S300 in this embodiment of the present invention, refer to step S100 shown in FIG. 1, and details are not described herein again.

S301: Configure the at least one target function module, where the at least one configured target function module is configured to process data according to the target network protocol.

For step S301 in this embodiment of the present invention, refer to step S101 shown in FIG. 1, and details are not described herein again.

S302: Process the data by using the at least one configured target function module.

For step S302 in this embodiment of the present invention, refer to step S102 shown in FIG. 1, and details are not described herein again.

S303: Establish, based on a specific protocol, a data connection to the target network protocol configuration apparatus identified by the device identifier, where the specific protocol includes at least one of a common public radio interface protocol or a common public physical interface protocol.

In an optional implementation manner, when a corresponding air interface service needs to be implemented on the data, multiple network protocol configuration apparatuses need to cooperate. For example, when corresponding network protocol processing needs to be performed on the data according to a network protocol, a network protocol configuration apparatus at a local end and the target network protocol configuration apparatus need to jointly complete the processing. The local end implements, on the data, only processing functions of layers including a Packet Data Convergence Protocol layer, a Radio Link Control Protocol layer, a Media Access Control layer, and a physical layer, and the target network protocol configuration apparatus needs to further process data processed by the local end, for example, perform radio frequency processing on the processed data. Therefore, the target network protocol configuration apparatus activates a radio frequency function module in a function module set of the target network protocol configuration apparatus, performs corresponding parameter configuration and physical resource allocation on the radio frequency function module, and the like, to further process the data processed by the local end, so as to complete entire processing that needs to be implemented by the target network protocol.

Specifically, a control-plane node encapsulates the device identifier of the target network protocol configuration apparatus into a control instruction. The network protocol configuration apparatus at the local end receives the control instruction, and obtains, by means of parsing, the device identifier of target network protocol configuration included in the control instruction. The data connection to the target network protocol configuration apparatus identified by the device identifier may be established based on the Common Public Radio Interface (Common Public Radio Interface, CPRI) protocol and the Common Public Physical Interface (Common Public Physical Interface, CPPI) protocol, or the data connection to the target network protocol configuration apparatus may be established based on the CPRI protocol or the CPPI protocol. A main function of the data connection is to prepare for subsequent data transmission.

S304: Transmit processed data to the target network protocol configuration apparatus.

In an optional implementation manner, the data on which target protocol processing has been performed is transmitted to the target network protocol configuration apparatus by using the established data connection. After receiving the processed data, the target network protocol configuration apparatus further processes the data. The target network protocol configuration apparatus also includes a function module set. Protocol processing completed by the local end and the target network protocol configuration apparatus may be: jointly implementing the processing functions of the layers including the Packet Data Convergence Protocol layer, the Radio Link Control Protocol layer, the Media Access Control layer, and the physical layer and a radio frequency function on service data according to a target network protocol. The local end may implement only the processing functions of the layers including the Packet Data Convergence Protocol layer, the Radio Link Control Protocol layer, the Media Access Control layer, and the physical layer, and the target network protocol configuration apparatus implements the radio frequency function. It should be noted that the target network protocol configuration apparatus may also perform forwarding routing processing on service data processed by the local end.

Further, the target network protocol configuration apparatus and the local end may be shown to the outside in multiple manners. For example, the target network protocol configuration apparatus and the local end may be integrated into a base station, or the target network protocol configuration apparatus and the local end are separately set as independent apparatuses. For different data, processing processes implemented by the local end and the target network protocol configuration apparatus may be different, but the local end and the target network protocol configuration apparatus may jointly implement the functions of the layers on the data according to a target network protocol. For example, for first data, the local end implements the processing functions of the layers including the Packet Data Convergence Protocol layer, the Radio Link Control Protocol layer, the Media Access Control layer, and the physical layer and the radio frequency function. In this case, the target network protocol configuration apparatus does not need to perform processing. For second data, the local end implements only the processing functions of the layers including the Packet Data Convergence Protocol layer, the Radio Link Control Protocol layer, the Media Access Control layer, and the physical layer, and the target network protocol configuration apparatus implements the radio frequency function. In this case, the target network protocol configuration apparatus needs to cooperate.

Further, the control-plane node determines whether the target network protocol configuration apparatus needs to further process the data on which target network protocol processing has been performed by the local end. The control-plane node indicates, to the local end and the target network protocol configuration apparatus by sending a control instruction, a processing process that needs to be performed.

In this embodiment of the present invention, when target protocol processing needs to be performed on service data by using a target network protocol rule, a target function module configured to perform the target protocol processing is selected, corresponding configuration is performed on the target function module by using a preset target configuration solution, and finally, the configured function module performs corresponding target protocol processing on the service data. In this network protocol configuration method, function modules that implement a same function do not need to be manufactured repeatedly in a device that performs different types of network protocol processing, and only corresponding configuration needs to be performed on a function module according to each type of specific network protocol processing, so that one function module can be shared by multiple types of protocol processing, but a configuration solution of the function module is different for each type of protocol processing. In this way, manufacturing costs of a network protocol configuration apparatus are reduced.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A network protocol configuration apparatus, comprising:
    a processor configured to:
        determine at least one target function module according to a target network protocol, wherein the target network protocol is a protocol used for data processing,
        configure the at least one target function module, wherein the at least one configured target function module is configured to process data according to the target network protocol, and
        process the data by using the at least one configured target function module;
    a receiver configured to:
        receive a control instruction, wherein the control instruction comprises a target application program identifier, and a target application program identified by the target application program identifier is used to process the data by using the target network protocol;
    the processor is further configured to:
        select the target application program from an application program set according to the target application program identifier, and execute the target application program, and
        select, from a function module set by using the target application program, the at least one target function module configured to perform the target network protocol processing;
    when the control instruction comprises configuration information for establishing a data connection relationship with a target network protocol configuration apparatus, wherein the configuration information carries a device identifier of the target network protocol configuration apparatus, the apparatus further comprises:
    a transmitter configured to transmit processed data to the target network protocol configuration apparatus; and
    wherein the processor is further configured to establish, based on a specific protocol, a data connection to the target network protocol configuration apparatus identified by the device identifier, wherein the specific protocol comprises at least one of a common public radio interface protocol or a common public physical interface protocol.

2. The network protocol configuration apparatus according to claim 1, wherein the processor is further configured to:
    activate the at least one target function module according to the target network protocol;
    determine a parameter configuration of the target function module, to enable the target function module to process the data by using the target network protocol;
    allocate a fragment physical resource to the target function module; and
    connect the target function module in tandem according to a tandem connection sequence corresponding to the target network protocol.

3. The network protocol configuration apparatus according to claim 2, wherein the processor is further configured to:

successively input to-be-processed data into the at least one tandem-connected target function module, to process the data.

4. A network protocol configuration method, comprising:

determining at least one target function module according to a target network protocol, wherein the target network protocol is a protocol used for data processing;

configuring the at least one target function module, wherein the at least one configured target function module is configured to process data according to the target network protocol;

processing the data by using the at least one configured target function module;

wherein determining the at least one target function module according to the target network protocol comprises:

receiving a control instruction, wherein the control instruction comprises a target application program identifier, and a target application program identified by the target application program identifier is used to process the data by using the target network protocol;

selecting the target application program from an application program set according to the target application program identifier, and executing the target application program; and selecting, by the target application program from a function module set, the at least one target function module configured to perform the target network protocol processing;

when the control instruction comprises configuration information used for establishing a data connection relationship with a target network protocol configuration apparatus, wherein the configuration information carries a device identifier of the target network protocol configuration apparatus, the method further comprises:

establishing, based on a specific protocol, a data connection to the target network protocol configuration apparatus identified by the device identifier, wherein the specific protocol comprises at least one of a common public radio interface protocol or a common public physical interface protocol; and after processing the data by using the at least one configured target function module, the method further comprises:

transmitting processed data to the target network protocol configuration apparatus.

5. The method according to claim 4, wherein configuring the at least one target function module comprises:

activating the at least one target function module according to the target network protocol determining a parameter configuration of the target function module, to enable the target function module to process the data by using the target network protocol;

allocating a fragment physical resource to the target function module; and connecting the target function module in tandem according to a tandem connection sequence corresponding to the target network protocol.

6. The method according to claim 5, wherein processing the data by using the at least one configured target function module comprises:

successively inputting to-be-processed data into the at least one tandem-connected target function module, to process the data.

* * * * *